United States Patent [19]
Nakamichi

[11] Patent Number: 5,574,711
[45] Date of Patent: Nov. 12, 1996

[54] DEVICE FOR DRIVING TRAYS IN DISK PLAYERS

[75] Inventor: Niro Nakamichi, Rancho Palos Verdes, Calif.

[73] Assignee: Nakamichi Corporation, Tokyo, Japan

[21] Appl. No.: 338,010

[22] Filed: Nov. 10, 1994

[30] Foreign Application Priority Data

Nov. 12, 1993 [JP] Japan .................................. 5-307336

[51] Int. Cl.[6] .................................................. G11B 17/04
[52] U.S. Cl. .................................................. 369/77.1
[58] Field of Search ............................... 369/75.1, 75.2, 369/77.1, 58; 340/99.02, 99.03, 99.06, 99.07

[56] References Cited

U.S. PATENT DOCUMENTS

| | | | |
|---|---|---|---|
| 4,809,254 | 2/1989 | Scheffler | 369/75.2 |
| 5,109,372 | 4/1992 | Caspers | 369/75.2 |
| 5,119,357 | 6/1992 | Tsuruta et al. | 369/75.2 |
| 5,195,078 | 3/1993 | Ikedo et al. | 364/75.2 |
| 5,204,850 | 4/1993 | Obata | 369/75.2 |

FOREIGN PATENT DOCUMENTS

| | | | |
|---|---|---|---|
| 0286770 | 10/1988 | European Pat. Off. . | |
| 59-072676 | 8/1984 | Japan . | |
| 59-215067 | 12/1984 | Japan . | |
| 60-50742 | 3/1985 | Japan | 369/77.2 |
| 60-93664 | 5/1985 | Japan | 369/77.1 |
| 60-147964 | 8/1985 | Japan | 369/77.1 |
| 60-173760 | 9/1985 | Japan . | |
| 61-172264 | 8/1986 | Japan | 369/77.1 |

*Primary Examiner*—Stuart S. Levy
*Assistant Examiner*—Paul J. Ditmyer
*Attorney, Agent, or Firm*—Morrison Law Firm

[57] ABSTRACT

A disk transport mechanism for moving disks into a disk-player transports disks between an eject position and a playback or storage position inside the disk-player. The tray passes through an opening in the disk-player when it moves from the eject position to the playback or storage position. The disk transport mechanism carries the disk on a tray with a circular recess which locates the disk precisely in the tray. A disk improperly placed in the tray, so that it rests on a ridge around the circular recess, could cause damage when the tray passes through the opening. To prevent this, the transport mechanism abruptly accelerates the tray during movement into the disk-player by momentarily halting or reversing a drive motor of the disk transport mechanism. The acceleration of the tray causes any improperly mounted disk to fall into the circular recess before the disk can jam in the opening, thereby preventing injury to the disk or the disk-player.

17 Claims, 6 Drawing Sheets

DEVICE FOR DRIVING TRAYS IN DISK PLAYERS

BACKGROUND OF THE INVENTION

The present invention relates to disk players for playing disk-shaped media (for example, compact disks). More particularly, the present invention relates to disk players that carry the recorded media on a carrier with a recess and that convey the carrier between a playback or store position, where the disk is played back, and an eject position, where the carrier is presented for the user to exchange disks.

Disk playback devices are known that carry disks on a carrier having a recess for locating the disk with respect to the carrier. Such carriers are transported by an automatic transport mechanism from an internal position to an eject position. In the eject position, a disk can be placed in the carrier. The disk and carrier can then be conveyed from the eject position to a storage location in the disk player for storage, or to a playback position for playback. The disk carrier has a recess which correctly locates the disk when the disk is placed in the recess while the carrier is in the eject position. If a disk is not properly placed in the carrier and the transport mechanism activated to transport the disk into the playback device, the disk can become caught between the edges of an opening in the playback device and a carriage holder of the transport mechanism. Damage to the disk or the player could result.

To prevent damage to a incorrectly loaded disk, a mechanism could be provided to forcibly shift the disk to its correct position before the disk and carriage are transported into the player. However, such an additional mechanism would increase the cost of production of the disk player.

OBJECTS AND SUMMARY OF THE INVENTION

An object of the present invention is to provide a disk playback device that overcomes the drawbacks of the prior art.

Another object of the present invention is to provide a disk playback device that protects disk media from damage during transport in the disk playback device.

Still another object of the present invention is to provide a disk playback device that is low in manufacturing cost.

Briefly, a disk transport mechanism for moving disks into a disk-player transports disks between an eject position and a playback or storage position inside the disk-player. The tray passes through an opening in the disk-player when it moves; from the eject position to the playback or storage position. The disk transport mechanism carries the disk on a tray with a circular recess which locates the disk precisely in the tray. A disk improperly placed in the tray, so that it rests on a ridge around the circular recess, could cause damage when the tray passes through the opening. To prevent this, the transport mechanism abruptly accelerates the tray during movement into the disk-player by momentarily halting or reversing a drive motor of the disk transport mechanism. The acceleration of the tray causes any improperly mounted disk to fall into the circular recess before the disk can jam in the opening, thereby preventing injury to the disk or the disk-player.

According to an embodiment of the present invention, there is described, a drive mechanism for moving a disk into a disk-player, comprising: A holder for holding the disk, the holder having a first position for receiving the disk and a second position on which the disk may rest, means for moving the holder into the disk-player, means for imparting at least one acceleration to the holder in addition to an initial acceleration and a final deceleration imparted by the means for moving and the at least one being effective to shift the disk from the second position to the first position when the disk is in the second position and the holder is moved into the disk-player.

According to another embodiment of the present invention, there is described, a drive mechanism for moving a disk into a disk-player, comprising: a holder for holding the disk, the holder having a first position for receiving the disk and a second position on which the disk may rest, a linear drive for moving the holder into the disk-player, the linear drive including a motor, a controller for actuating and controlling a direction of rotation of the motor, the controller including means for driving the motor in a reverse direction to bring the holder out of the disk-player to an eject position, the controller including means for driving the motor in a substantially forward direction to bring the holder into the disk-player to a store position and the controller including means for halting the motor, or reversing the motor, for a period of time when the motor is driven in the substantially forward direction to bring the holder into the disk-player, whereby the disk resting in the second position falls into the first position.

According to still another embodiment of the present invention, there is described, aa drive mechanism for moving a disk into a disk-player, comprising: a tray for holding the disk, the tray having a first position for receiving the disk and a second position on which the disk may rest, a linear drive for moving the tray into the disk-player, the disk-player having an opening tough which the tray moves, the linear drive including a motor, a controller for actuating and controlling a direction of rotation of the motor, the controller including means for driving the motor in a reverse direction to bring the tray out of the disk-player to an eject position, the controller including means for driving the motor in a substantially forward direction to bring the tray into the disk-player to a store position and the controller including means for halting the motor, or reversing the motor, for a period of time when the motor is driven in the substantially forward direction to bring the tray into the disk-player, whereby the disk resting in the second position falls into the first position.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
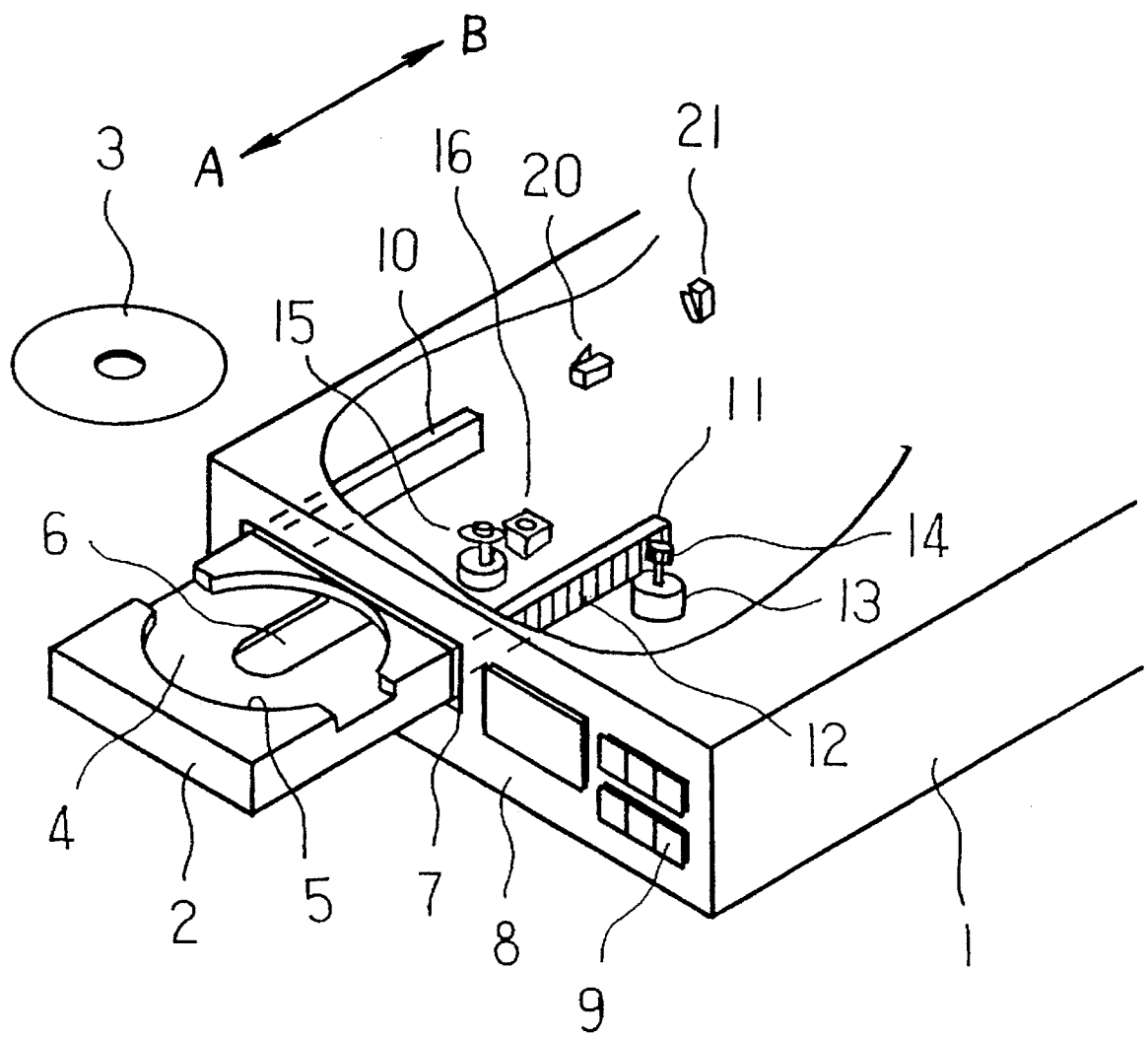
FIG. 1 is a schematic perspective drawing of a disk player according to an embodiment of the present invention.

Referring to FIG. 1, a disk playback device 1 (hereafter, "player") has a tray 2, movable into and out of player 1 in the directions of arrows A–B. Tray 2 has a circular recess 4 defined by ledge 5 which receives and locates a disk 3 with respect to tray 2. A slot 6 provides an opening for scanning a surface of disk 3 when disk 3 is played by player 1. Player 1 is shown with tray 2 in the eject position. When tray 2 is in the eject position tray 2 projects out of an opening 7 in a front panel 8 of player 1. Disk 3 can be placed in, or removed from, circular recess 4 by a user when tray 2 is in the eject position. User switch 9 on front panel 8 allow a user to operate player 1 by entering various commands as explained below.

A pair of guide rails 10, 11 support tray 2. Guide rails 10, 11 are slidably supported by stationary guides on player 1 to allow tray 2 to move out to the eject position and back into player 2 for playback and/or storage of disk 3. Rack 12 meshes with a gear 14 connected to a rotating shaft of a tray drive motor 13. Rotation of the rotating shaft of tray drive motor 13 drives gear 14 which drives rack 12 translating tray 2 selectively between the eject position and a playback or store position in the directions of arrows A–B.

Tray 2 is moved in the direction of arrow B to the playback position inside player 1. A turntable 15 is moved upward through slot 6 to engage and raise disk 3 from circular recess 4 in tray 2 toward a clamp (not shown). Disk 3 is held between the clamp and turntable 15 and rotated when turntable 15 spins. An optical pickup 16, containing an object lens is moved toward a surface of disk 3 as disk 3 is rotated. Optical pickup 16 scans the surface with a laser and reads a reflected beam to generate a signal that is processed to play back information recorded on disk 3.

A center position detection switch 20 is located on player 1 along the path of left guide rail 10 to be triggered when tray 2 is at a center position between the eject position and the loading position. A loading position detection switch 21 is located to be triggered when tray 2 arrives at a store position where disk 3 is played.

Figure 2:
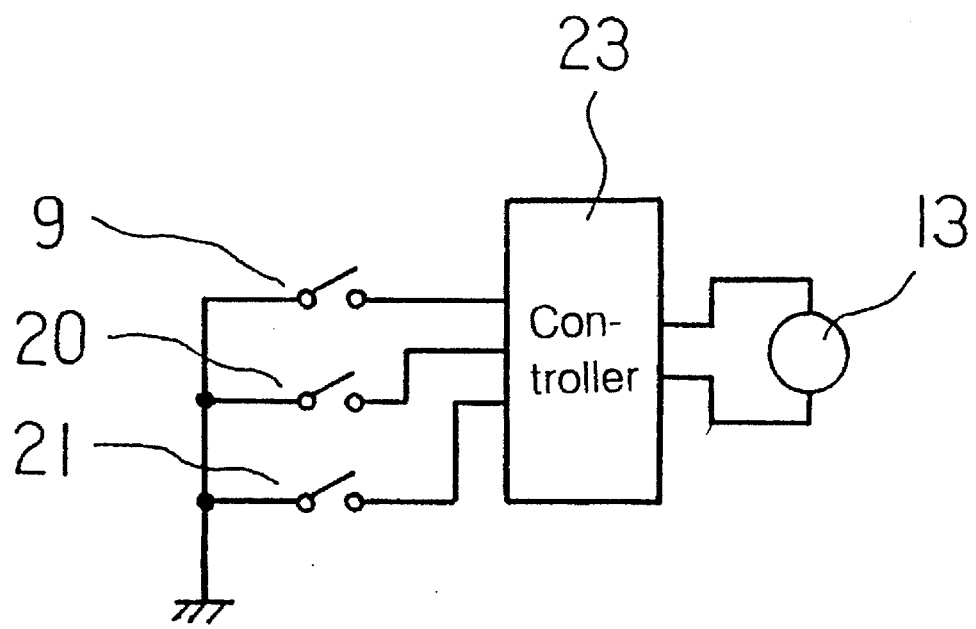
FIG. 2 is a block diagram showing a disk player control system for moving a tray of the disk player according to an embodiment of the present invention.

Referring to FIG. 2, movement of tray 2 by tray drive motor 13 is controlled by a control circuit 23 that includes a microprocessor or equivalent device. Control circuit 23 receives signals from a user switch 9, center position detection switch 20, and loading position detection switch 21. Control circuit 23 controls tray drive motor 13 in response to the settings of these switches.

Figure 3:
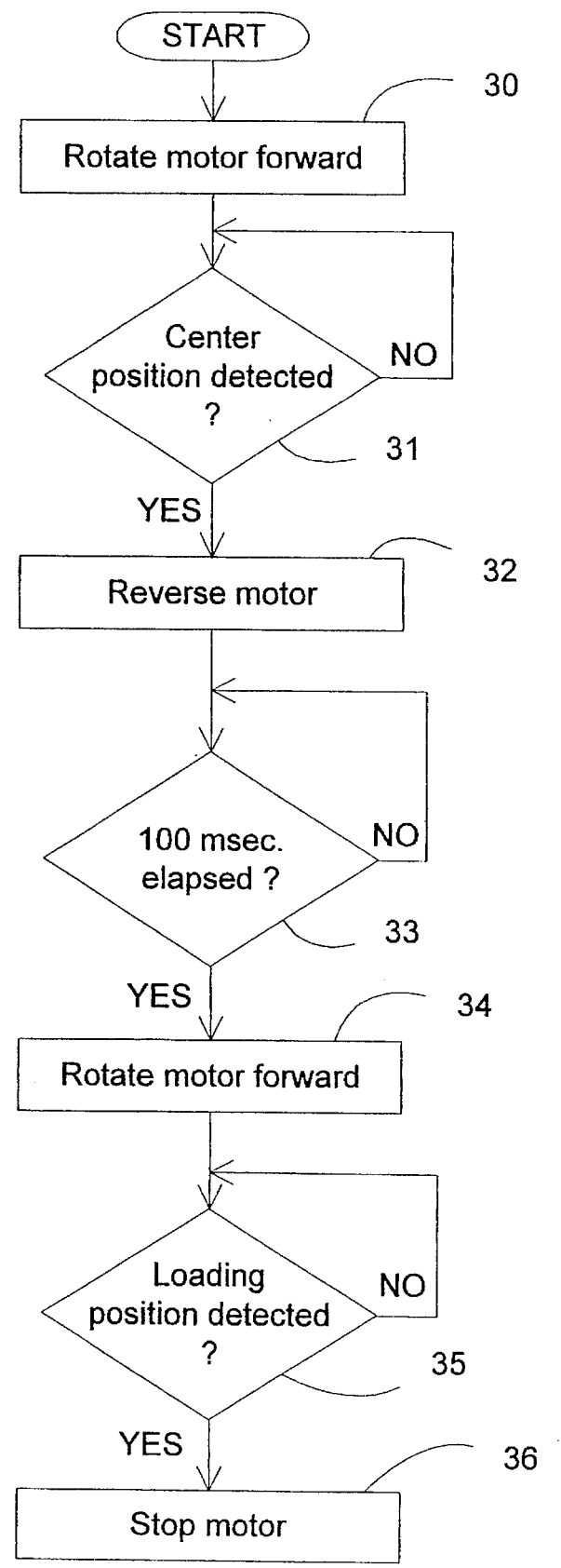
FIG. 3 is a flowchart showing the control signal and operations flow of the disk player control system of FIG. 2.

Referring to FIGS. 1 and 3, a first control method for controlling tray drive motor 13 by control circuit 23 begins when user switch 9 is pressed while tray 2 is at the eject position. Tray drive motor 13 is activated to rotate in a forward direction at step 30. As tray drive motor 13 rotates in the forward direction, tray 2 moves in the direction of arrow B. When tray 2 reaches the center position, center position detection switch 20 is activated in step 31. In step 32, activation of center switch 20 causes control circuit 23 to drive tray drive motor 13 in a reverse direction. Control then loops through step 33 for 100 msec. while tray drive motor 13 runs in reverse. The reverse rotation of tray drive motor 13 causes tray 2 to reverse direction for the same period of time in the direction of arrow A. After 100 msec., control passes to step 34 where tray drive motor 13 is again driven in the forward direction by control circuit 23. When tray 2 arrives at the loading position inside player 1, loading position detection switch 21 is triggered at step 35. Triggering of loading-position detection switch 21 causes control circuit 23 to halt tray drive motor 13 at step 36, which is the end of the loading operation.

Figure 4:
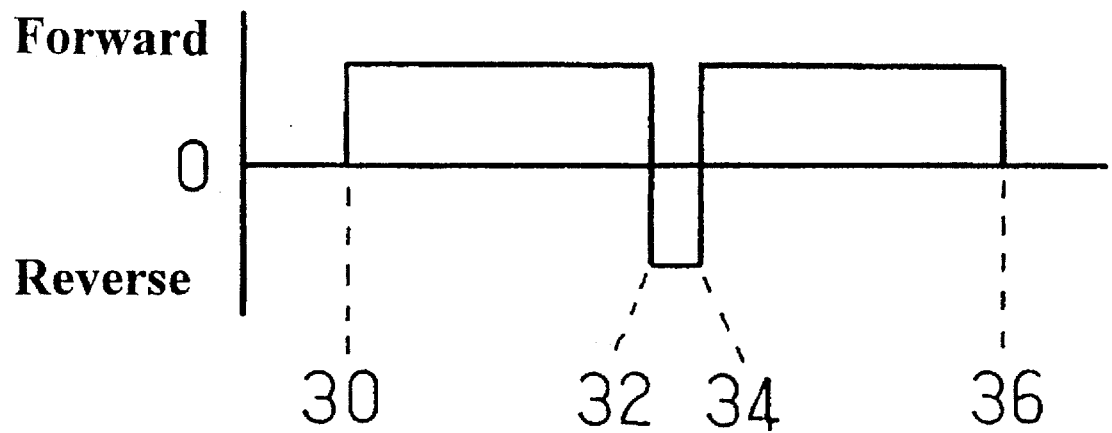
FIG. 4 is a time chart showing the operation of a motor as driven according to the flowchart of FIG. 3.
Figure 7:
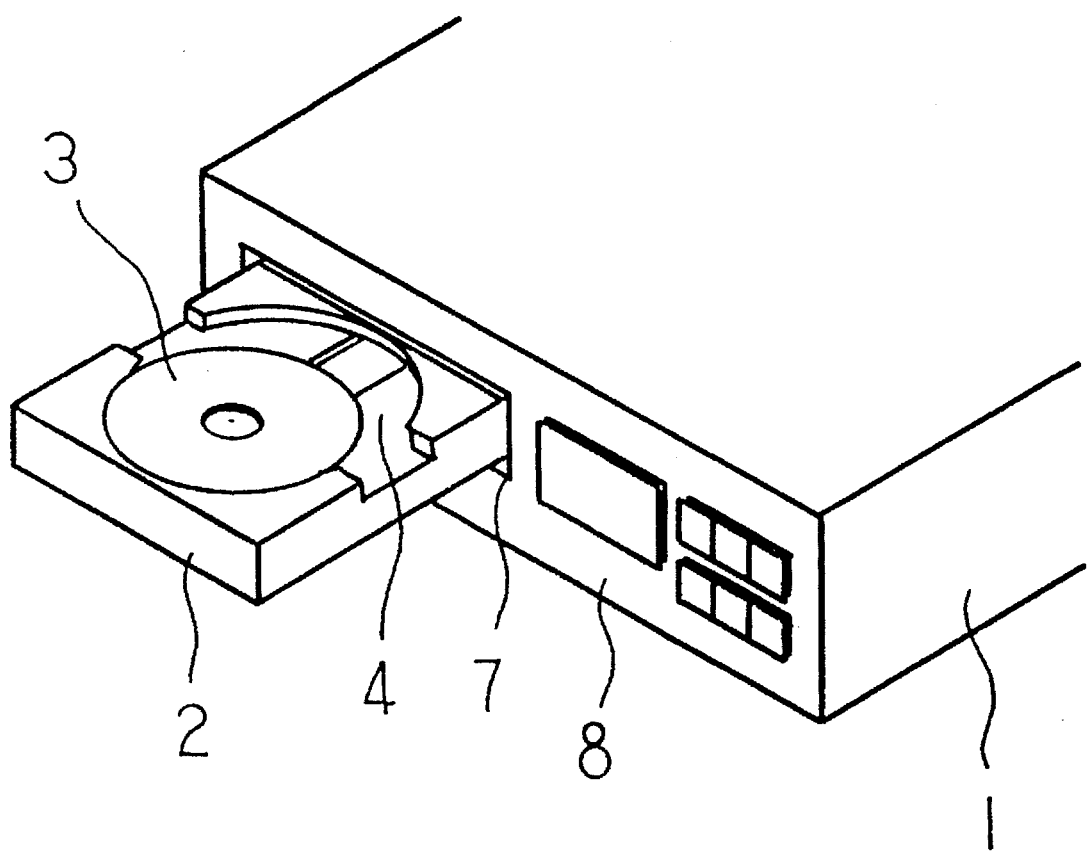
FIG. 7 is a schematic perspective drawing of the disk player having a disk improperly mounted in the tray.

Referring to FIG. 4 the chronological sequence of the motion of tray drive motor 13 are correlated with the steps of the flowchart of FIG. 3. The abrupt reverse and forward rotation of tray drive motor 13 that occurs at steps 32 and 34 corresponds to abrupt reverse and forward acceleration of tray 2. These abrupt reverse and forward accelerations of tray 2 tend to cause disk 3 shift relative to tray 2 when disk 3 is resting in an incorrect position relative to circular recess 4. Thus, disk 3 resting on ledge 5 (See FIG. 7, which shows disk 3 incorrectly mounted in tray 2) tends to drop into circular recess 4, and once in place, be retained in circular recess 4 where disk 3 is snugly confined. The reason disk 3 tends to drop into its proper position in circular recess 4 is that the position of disk 3 in circular recess 4 is lower than any resting position on ledge 5 making the proper resting :position a local potential energy-minimum position for disk 3. In addition, any resting position on ledge 5 is unstable because there are no means for retaining disk 3 on ledge 5 when tray 2 is abruptly shifted. The combination of the instability of the improper resting position on ledge 5, the fact that the proper position is a local potential energy-minimum position, and the fact that once disk 3 is in the proper position, disk 3 is snugly confined, makes it likely that disk 3 will shift into its proper position when tray 2 is accelerated as described. In addition, because of the snug Confinement of disk 3 in circular recess 4, when disk 3 is mounted properly in circular recess 4 while tray 2 moves from the eject position to the loading position, disk 3 stays in place despite the acceleration of tray 2.

Figure 5:
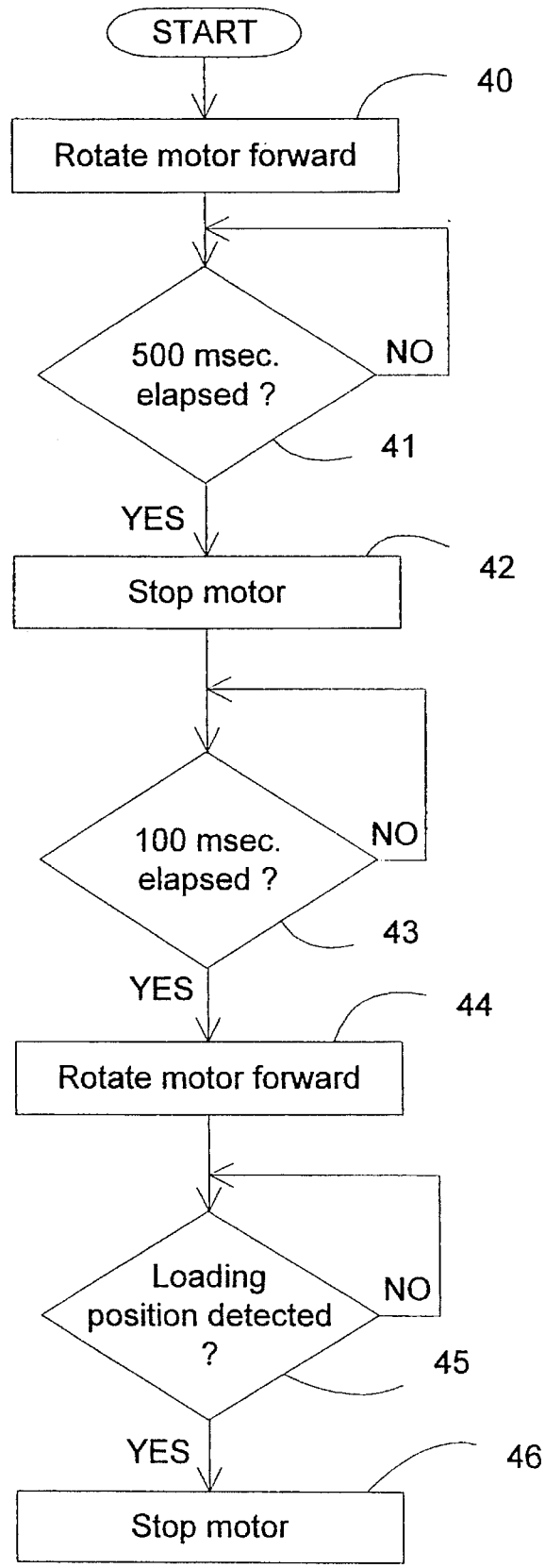
FIG. 5 is a flowchart showing the control flow of the motor by a control circuit according to another embodiment of the present invention.

Referring to FIG. 5, according to a second control method of tray drive motor 13 by control circuit 23, when tray 2 is in the eject position and user switch 9 is pressed, tray drive motor 13 is initially rotated in the forward direction at step 40. The forward rotation of tray drive motor 13 causes tray 2 to move in the direction of arrow B. After tray 2 moves for 500 msec., as control loops through step 41, control circuit 23 halts rotation of tray drive motor 13 at step 42. Control loops through step 43 for 100 msec. after which, control proceeds to step 44. At step 44, tray drive motor 13 is again rotated in the forward direction until the arrival of tray 2 at the loading position is detected by actuation of loading position detection switch 21 at step 45. The arrival of tray 2 at the loading position completes the loading operation of tray 2.

Figure 6:
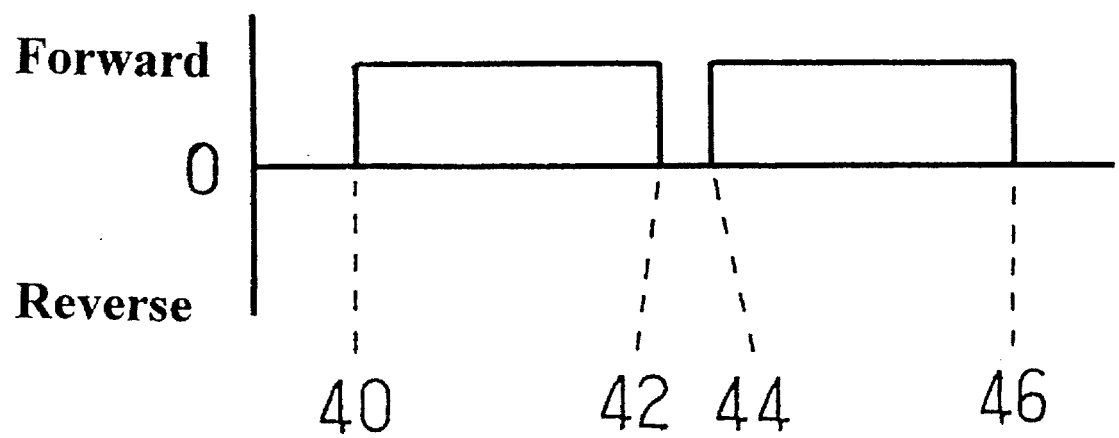
FIG. 6 is a time chart showing the operation of a motor as driven according to the flowchart of FIG. 5.

Referring to FIG. 6, the chronological sequence of the motion of tray drive motor 13 is correlated with the steps of the flowchart of FIG. 5. The abrupt halting and resumption of forward rotation of tray drive motor 13 that occurs at step 42 and 44 corresponds to abrupt reverse and forward accel-eration of tray 2. These abrupt reverse and forward accel-erations of tray 2 tend to cause disk 3 to shift relative to tray 2 when disk 3 is resting in an incorrect position relative to circular recess 4 for the reasons given above. Thus, disk 3 resting on ledge 5 tends to drop into circular recess 4, and once in place, be retained in circular recess 4 where disk 3 is snugly confined.

In the embodiment of FIGS. 5 and 6, the total change in velocity of tray 2, caused by the successive abrupt accel-erations, is not as great as in the embodiment of FIGS. 3 and 4. Thus, the total acceleration of tray 2 may be greater in the latter instance than in the first. However, too much acceleration could cause disk 3 to come off tray 2 altogether. Thus, depending on the detailed characteristics of tray 2 such as its shape, surface material, etc. the best embodiment may be chosen accordingly. In addition, control of tray drive motor 13 can be varied to alter the reverse and forward acceleration, such as by varying the power of tray drive motor 13 or by electrically bridging the leads of tray drive motor 13 with a selected resistance to impart a self-braking action when tray drive motor is halted. Another consideration in selecting the control sequence of tray drive motor 13 is the possible undesirable appearance of tray 2 suddenly reversing direction.

Still another consideration in choosing between the two embodiments of the invention is that fact that the second embodiment does not require a center position detection switch. Thus, the second embodiment requires fewer parts, making the second embodiment potentially less expensive to manufacture and potentially more reliable.

Various alterations of the embodiment described above may be effected by those of ordinary skill in the art having the benefit of this description without departing from the scope and spirit of the present invention. For example, although in the embodiments described, no changer mechanism of player 1 was described, player 1 could include a changer mechanism and means for storing a number of disks 3. In such a player, tray 2 could be moved according either is of the two control schemes to either a storage position in player 1 or a playback position. Such embodiments are considered to be in the scope of the present invention.

In the embodiments described, tray drive motor 13 was driven to impose a reverse and forward acceleration to tray 2 whenever tray 2 returned from the eject position. However, according to alternative embodiments of the invention, tray 2 is driven with the reverse and forward acceleration only when mismounting of disk 3 is detected. For example, a contact or optical sensor could be included in tray 2 to detect when disk 3 is in an incorrect position: Alternatively, a sudden increase in the load of tray drive motor 13 manifested by a surge in current, caused by a disk caught in opening 7, could be detected and used to invoke the acceleration control scheme described. Such alternative embodiments are considered to be in the scope of the present invention.

According to the embodiments described, only one backward acceleration followed by one forward is added to the movement of tray 2. However, in other embodiments it is possible for tray 2 to be driven so that a number of acceleration intervals are added to the movement of tray 2. For example, tray drive motor 13 could be halted abruptly a number of times in rapid succession to produce a vibration-like effect to dislodge disk 3. Such embodiments are considered to be in the scope of the present invention.

According to the embodiments described, a rack and pinion drive mechanism is used to drive tray 2. However, in other embodiments; tray 2 could be driven by other drive mechanisms such as a trolley mechanism. Such embodiments are considered to be in the scope of the present invention.

According to the embodiments described, an electronic circuit is used to control a motor to cause tray 2 to undergo a series of accelerations in the direction of movement. However, other embodiments are possible where acceleration could be induced in other directions with respect to the general direction of movement of tray 2. Such accelerations could be induced by mechanical or electrical means. For example, a sawtooth array of bumps on a guide rail on which tray 2 rested as it was moved in and out of player 2 could impart a series of vertically-directed accelerations to tray 2 as it moved. Such embodiments are considered to be in the scope of the present invention.

According to the embodiments described above, the disk mounting area is a circular recess on a tray. However, the present invention can be applied to other devices for moving disks in and out of player 1. For example, a tray having upwardly extending pins instead of a circular recess could be used to locate a disk precisely. Even a boom with a polar array of tines having upwardly extending ends could be used. Many such devices for locating a disk could be devised and used in a disk player with the present invention. The only requirement is that the disk holder have a position into which an improperly mounted disk would likely fall should the disk holder be abruptly accelerated. Such alternative embodiments are considered to be in the scope of the present invention.

According to the first embodiment, tray 2 is driven in reverse after center position detection switch 20 is triggered and in the second embodiment, tray 2 is temporarily halted after the lapse of a certain time. According to other embodiments of the invention, tray 2 is driven in reverse after the lapse of a certain time and tray 2 is temporarily halted when center position detection switch is triggered. Also note that center position detection switch 20 could be located in a variety of locations between the eject position and the store position. In addition, note that the time period after which tray 2 is halted or reversed could be a time other than 500 msec. Such alternative embodiments are considered to be in the scope of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A drive mechanism for moving a disk into a disk-player, comprising:

a holder for holding said disk;

said holder having a recess with a bottom;

said recess being defined by a portion of said holder above said bottom;

a first position at said bottom of said recess for receiving said disk when said disk is placed correctly in said holder and a second position on said portion above said bottom of said holder on which an edge of said disk may rest when said disk is placed incorrectly in said holder;

said disk remaining in said second position by a force of friction;

means for moving said holder into said disk-player;

said means for moving including means for imparting at least one acceleration to said holder in addition to an initial acceleration and a final deceleration imparted by said means for moving;

said means for imparting being responsive to one of a distance of displacement of said holder and a timing of displacement of said holder;

said at least one acceleration being sufficiently abrupt to overcome said force of friction to dislodge said disk, whereby said disk in said second position is suddenly moved from said second position;

said recess being shaped such that said disk tends to fall toward said bottom when said disk is suddenly moved from said second position, whereby said at least one acceleration is effective to shift said disk from said second position to said first position when said disk is in said second position prior to said at least one acceleration.

2. A drive as in claim 1, wherein:

said means for moving includes a drive motor and a linear translation drive drivably connected to said drive motor and holder for moving said holder horizontally into said disk-player; and said means for imparting includes means for halting, and subsequently restarting, said drive motor.

3. A drive as in claim 1, wherein:

said means for moving includes a drive motor and a linear translation drive drivingly connected to said drive-motor and said holder for moving said holder horizontally into said disk-player; and said means for imparting includes means for reversing said drive motor for at least one period of time while said holder is moved into said disk player.

4. A drive mechanism for moving a disk into a disk-player, comprising:

a holder for holding said disk;

said holder having a first position for receiving said disk and a second position on which said disk may rest;

a linear drive for moving said holder into said disk-player;

said linear drive including a motor;

a controller for actuating, and controlling a direction of rotation of, said motor;

said controller including means for driving said motor in a reverse direction to bring said holder out of said disk-player to an eject position;

said controller including means for driving said motor in a substantially forward direction to bring said holder into said disk-player to a store position;

said controller including means for reversing said motor for at least one period of time when said motor is driven in said substantially forward direction to bring said holder into said disk-player, whereby said disk, resting in said second position, falls into said first position;

means for sensing an intermediate position of said holder;

said intermediate position lying between said eject position and said store position; and said means for reversing said motor is responsive to said means for sensing.

5. A drive mechanism for moving a disk into a disk-player, comprising:

a holder for holding said disk;

said holder having a first position for receiving said disk and a second position on which said disk may rest;

a linear drive for moving said holder into said disk-player;

said linear drive including a motor;

a controller for actuating, and controlling a direction of rotation of, said motor;

said controller including means for driving said motor in a reverse direction to bring said holder out of said disk-player to an eject position;

said controller including means for driving said motor in a substantially forward direction to bring said holder into said disk-player to a store position;

said controller including means for halting said motor for at least one period of time when said motor is driven in said substantially forward direction to bring said holder into said disk-player, whereby said disk, resting in said second position, falls into said first position;

means for sensing an intermediate position of said holder;

said intermediate position lying between said eject position and said store position; and said means for halting said motor is responsive to said means for sensing.

6. A drive mechanism for moving a disk into a disk-player, comprising:

a holder for holding said disk;

said holder having a first position for receiving said disk and a second position on which said disk may rest;

a linear drive for moving said holder into said disk-player;

said linear drive including a motor;

a controller for actuating, and controlling a direction of rotation of, said motor;

said controller including means for driving said motor in a reverse direction to bring said tray out of said disk-player to an eject position;

said controller including means for driving said motor in a substantially forward direction to bring said holder into said disk-player to a store position;

said controller including means for halting said motor for at least one period of time when said motor is driven in said substantially forward direction to bring said holder into said disk-player, whereby said disk, resting in said second position, falls into said first position;

means for timing an interval after a start of a movement of said holder into said disk-player; and said means for halting said motor is responsive to said means for timing.

7. A drive mechanism for moving a disk into a disk-player, comprising:

a holder for holding said disk;

said holder having a first position for receiving said disk and a second position on which said disk may rest;

a linear drive for moving said holder into said disk-player;

said linear drive including a motor;

a controller for actuating, and controlling a direction of rotation of, said motor;

said controller including means for driving said motor in a reverse direction to bring said holder out of said disk-player to an eject position;

said controller including means for driving said motor in a substantially forward direction to bring said holder into said disk-player to a store position;

said controller including means for reversing said motor for at least one period of time when said motor is driven in said substantially forward direction to bring said holder into said disk-player, whereby said disk, resting in said second position, falls into said first position;

means for timing an interval after a start of a movement of said holder into said disk-player; and said means for reversing said motor is responsive to said means for timing.

8. A drive mechanism for moving a disk into a disk-player, comprising:

a tray for holding said disk;

said tray having a first position for receiving said disk and a second position above said first position on which said disk may rest when said disk is imperfectly aligned with said first positions;

a linear drive for moving said tray into said disk-player;

said disk-player having an opening through which said tray moves;

said linear drive including a motor;

a controller for actuating and controlling a direction of rotation of said motor;

said controller including means for driving said motor in a reverse direction to bring said tray out of said disk-player to an eject position;

said controller including means for driving said motor in a substantially forward direction to bring said tray into said disk-player to a store position; and said controller including means for one of halting and reversing said motor, abruptly, for at least one instant of time when said motor is driven in said substantially forward direction to bring said tray into said disk-player, an abruptness of said one of halting and reversing being such that said disk resting in said second position falls into said first position.

9. A drive mechanism for moving a disk into a disk-player, comprising:

a tray for holding said disk;

said tray having a first position for receiving said disk and a second position on which said disk may rest;

a linear drive for moving said tray into said disk-player;

said disk-player having an opening through which said tray moves;

said linear drive including a motor;

a controller for actuating and controlling a direction of rotation of said motor;

said controller including means for driving said motor in a reverse direction to bring said tray out of said disk-player to an eject position;

said controller including means for driving said motor in a substantially forward direction to bring said tray into said disk-player to a store position; and said controller including means for reversing said motor for at least one period of time when said motor is driven in said substantially forward direction to bring said tray into said disk-player, whereby said disk resting in said second position falls into said first position;

means for sensing an intermediate position of said tray;

said intermediate position lying between said eject position and said store position;

said tray being substantially outside said opening when said tray is in said intermediate position;

said means for reversing said motor is responsive to said means for sensing whereby said disk resting in said second position falls into said first position before said tray is moved substantially through said opening.

10. A drive mechanism for moving a disk into a disk-player, comprising:

a tray for holder said disk;

said tray having a first position for receiving said disk and a second position on which said disk may rest;

a linear drive for moving said tray into said disk-player;

said disk-player having an opening through which said tray moves;

said linear drive including a motor;

a controller for actuating and controlling a direction of rotation of said motor;

said controller including means for driving said motor in a reverse direction to bring said tray out of said disk-player to an eject position;

said controller including means for driving said motor in a substantially forward direction to bring said tray into said disk-player to a store position; and said controller including means for halting said motor for at least one period of time when said motor is driven in said substantially forward direction to bring said tray into said disk-player, whereby said disk resting in said second position falls into said first position;

means for sensing an intermediate position of said tray;

said intermediate position lying between said eject position and said store position;

said tray being substantially outside said opening when said tray is in said intermediate position;

said means for halting said motor is responsive to said means for sensing whereby said disk resting in said second position falls into said first position before said tray is moved substantially through said opening.

11. A drive mechanism for moving a disk into a disk-player, comprising:

a tray for holding said disk;

said tray having a first position for receiving said disk and a second position on which said disk may rest;

a linear drive for moving said tray into said disk-player;

said disk-player having an opening through which said tray moves;

said linear drive including a motor;

a controller for actuating and controlling a direction of rotation of said motor;

said controller including means for driving said motor in a reverse direction to bring said tray out of said disk-player to an eject position;

said controller including means for driving said motor in a substantially forward direction to bring said tray into said disk-player to a store position; and said controller including means for halting said motor for at least one period of time when said motor is driven in said substantially forward direction to bring said tray into said disk-player, whereby said disk resting in said second position falls into said first position;

means for timing an interval after a start of a movement of said tray into said disk-player;

said interval being such that said tray is still substantially outside said opening after a lapse of said interval; and said means for halting said motor is responsive to said means for timing whereby said disk resting in said second position falls into said first position before said tray is moved substantially through said opening.

12. A drive mechanism for moving a disk into a disk-player, comprising:

a tray for holding said disk;

said tray having a first position for receiving said disk and a second position on which said disk may rest;

a linear drive for moving said tray into said disk-player;

said disk-player having an opening through which said tray moves;

said linear drive including a motor;

a controller for actuating and controlling a direction of rotation of said motor;

said controller including means for driving said motor in a reverse direction to bring said tray out of said disk-player to an eject position;

said controller including means for driving said motor in a substantially forward direction to bring said tray into said disk-player to a store position; and said controller including means for reversing said motor for at least one period of time when said motor is driven in said substantially forward direction to bring said tray into said disk-player, whereby said disk resting in said second position falls into said first position;

means for timing an interval after a start of a movement of said tray into said disk-player;

said interval being such that said tray is still substantially outside said opening after a lapse of said interval; and said means for reversing said motor is responsive to said means for timing whereby said disk resting in said second position falls into said first position before said tray is moved substantially through said opening.

13. A drive mechanism for moving a disk into a disk-player, comprising:

a holder for holding said disk;

said holder having a receiving position for receiving said disk;

said receiving position being effective to hold said disk stably;

a second position on said holder, less stable than said receiving position, upon which said disk may come to rest when said disk is improperly inserted in said receiving position;

means for moving said holder into said disk-player;

means for imparting at least one acceleration to said holder in addition to an initial acceleration and a final deceleration imparted by said means for moving;

said at least one acceleration being effective to cause said disk in said second position to shift from said second position to said receiving position means for sensing an intermediate position of said holder;

said intermediate position being along a path of movement of said means for moving; and said means for imparting is a means for halting said motor responsive to said means for sensing.

14. A drive mechanism as in claim 13, wherein:

said holder includes a tray having a recess into which said disk sits when said disk is in said receiving position.

15. A drive mechanism as in claim 14, wherein:

said tray has a ridge portion at least partially surrounding said recess; and said second position is such that at least part of said disk rests on said ridge portion.

16. A drive mechanism as in claim 13, wherein:

said holder includes a tray;

said tray has a ridge portion at least partially surrounding said disk, when said disk is in said receiving position; and said second position is such that at least part of said disk rests on said ridge portion.

17. A drive mechanism for a moving a disk into a disk-player, comprising:

a disk holder for holding a disk;

said disk holder having means for permitting said disk to be placed in a stable position in said disk holder and held in said stable position by said disk holder;

said disk holder having means for supporting said disk in an unstable position, on said disk holder, above said stable position, on which said disk may rest when improperly inserted in said disk holder, said disk being held in said unstable position by a force of friction;

means for moving said disk holder from an access position for placing said disk in said disk holder to another position for one of storing and playing said disk;

said means for moving including first means for accelerating and decelerating said disk, whereby said disk holder is displaced at least between said access position and said another position; and said means for moving including second means for accelerating said disk holder, during a movement of said means for moving, after an acceleration, and prior to a deceleration of said first means for accelerating and decelerating;

said second means for accelerating producing an acceleration sufficiently abrupt to overcome said force of friction, so that, when said disk is in said stable position, said disk remains in said stable position and when said disk is in said unstable position, said disk falls into said stable position.

* * * * *